R. P. FOX.
SAFETY SUPPORT FOR FLYING MACHINES
APPLICATION FILED MAR. 7, 1913.
1,073,977.
Patented Sept. 23, 1913.
3 SHEETS—SHEET 2.
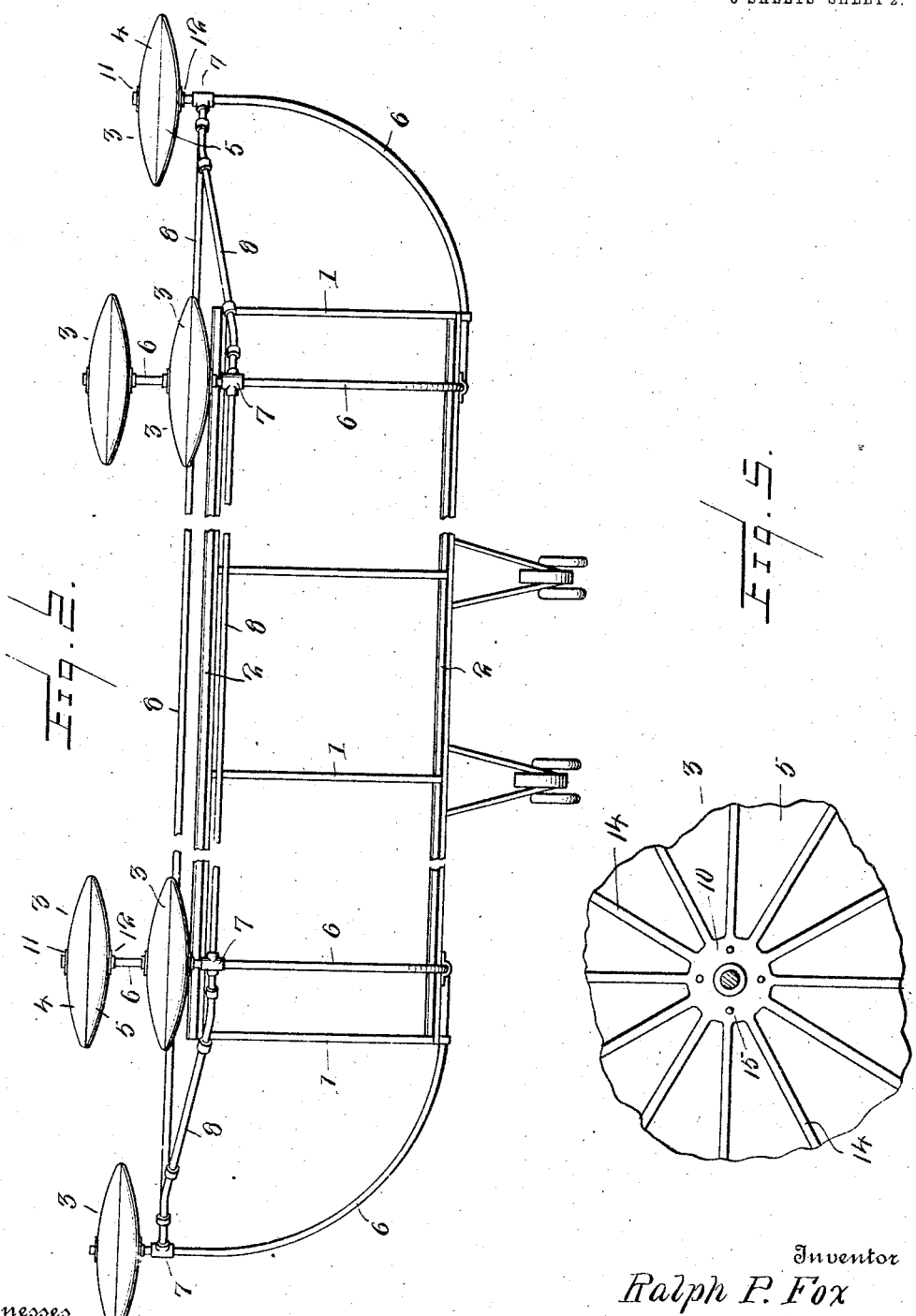
Inventor
Ralph P. Fox
By Victor J. Evans
Attorney
Witnesses

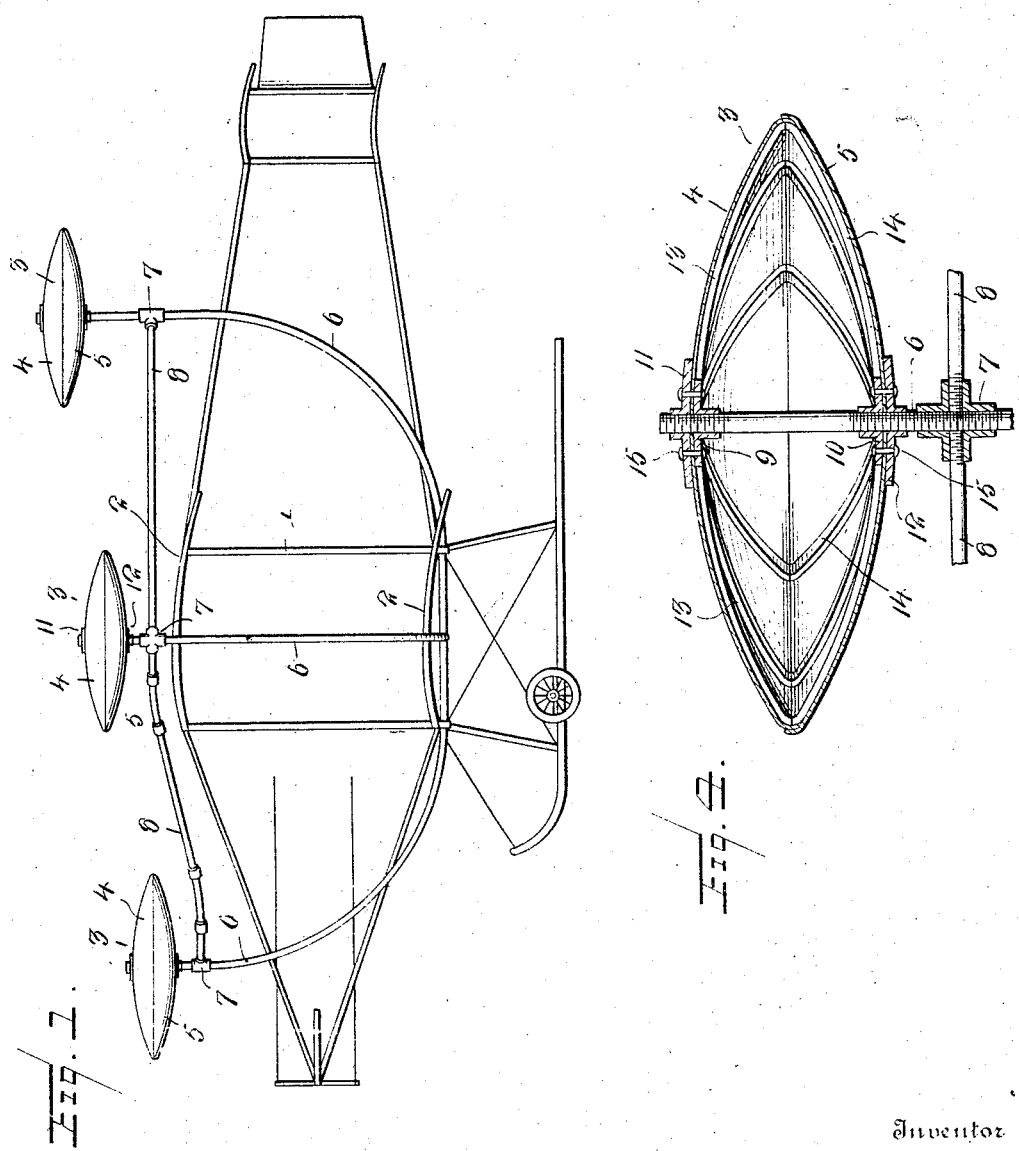

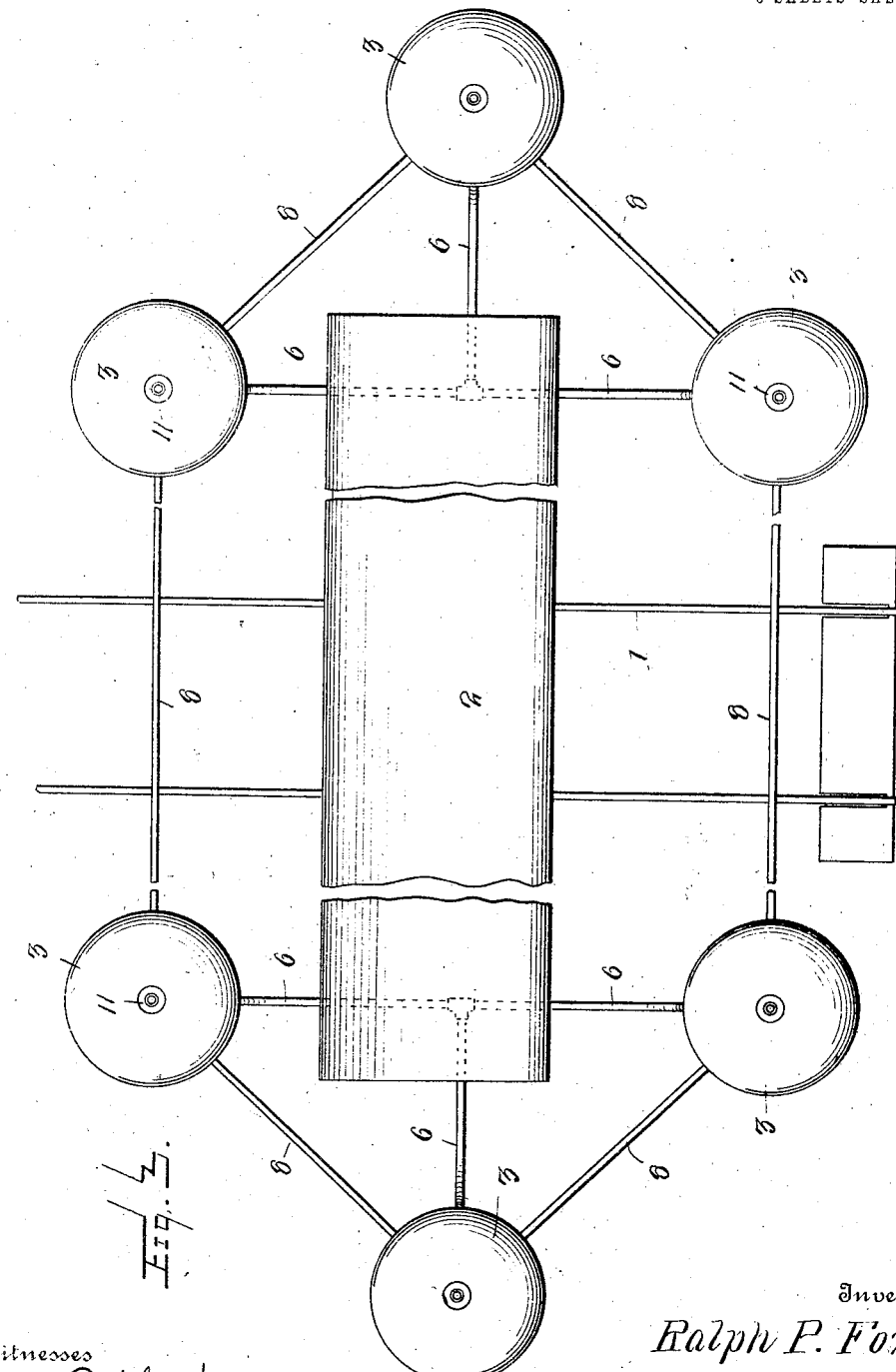

UNITED STATES PATENT OFFICE.

RALPH P. FOX, OF FORT HANCOCK, NEW JERSEY.

SAFETY-SUPPORT FOR FLYING-MACHINES.

1,073,977.

Specification of Letters Patent.  Patented Sept. 23, 1913.

Application filed March 7, 1913. Serial No. 752,702.

*To all whom it may concern:*

Be it known that I, RALPH P. FOX, a citizen of the United States, residing at Fort Hancock, in the county of Monmouth and State of New Jersey, have invented new and useful Improvements in Safety-Supports for Flying-Machines, of which the following is a specification.

This invention relates to safety supports for flying machines, and its object is to provide a novel construction and arrangement of auxiliary balancing and supporting surfaces, constituting extensions beyond the front, rear and sides of the main supporting surface, acting to resist any tendency of the machine to move unduly out of a state of balance or poise, whereby the equilibrium of the machine will be maintained.

The invention consists of the features of construction, combination and arrangement of parts hereinafter fully described and claimed, reference being had to the accompanying drawings, in which:—

Figure 1 is a view in side elevation of a flying machine equipped with my invention. Fig. 2 is a front elevation of the same. Fig. 3 is a top plan view. Fig. 4 is an enlarged vertical section through one of the auxiliary supporting and balancing surfaces. Fig. 5 is a sectional plan view on the line 5—5 of Fig. 4.

Referring to the drawings, 1 designates the frame and 2 the supporting surface, as a whole, of a flying machine of any of the types in common use. In the present instance I have shown the application of the invention to a biplane structure, although it is equally applicable to other multiplane structures, or to a monoplane structure.

In carrying my invention into practice I provide a series of auxiliary balancing and supporting surfaces 3, which are connected with and supported from the frame of the machine, and are so disposed as to constitute extensions beyond the margins of the supporting surface 2, to resist any deflection of the machine as a whole from a normal balanced position.

As shown, six auxiliary balancing and supporting surfaces may be employed. Two of these auxiliary balancing and supporting surfaces are arranged, respectively suitable distances in advance and in rear of the main supporting surface 2, while the remainder of said auxiliary balancing and supporting surfaces are preferably arranged in fore and aft pairs on longitudinal sides of the center of the machine adjacent to or at any desired distance beyond the lateral margins of the main supporting surface 2. In practice, the front and rear and lateral auxiliary balancing and supporting surfaces may be disposed at equal distances from the center of gravity of the machine, for reliable action in maintaining the machine in a state of equilibrium.

Each auxiliary balancing and supporting surface comprises an approximately circular hollow body, of circular form in plan and oval or elliptical form in vertical transverse section, said body consisting of upper and lower concavo-convex disks 4 and 5 of canvas or other suitable material and having their concave sides facing each other. The body 3 is mounted upon a rod or staff 6 which extends therethrough, and also passes through a crown piece or collar 7 provided with arms 8 secured to the machine frame, whereby the rod or staff is braced therefrom.

The disks 4 and 5 are arranged to rest against heads 9 and 10 threaded or otherwise secured to the shaft and are stayed and clamped against said heads by outer clamping plates 11 and 12, which are also threaded or otherwise secured to the rod or staff. Curved or bowed sets of frame arms 13 and 14 extend from the heads 9 and 10 and support the disks in extended position. Bolts or other suitable fastenings 15 pass through the disks, heads and clamping plates and firmly unite the same, while the outer ends of the frame arms 13 and 14 are also suitably secured together in alined pairs, and the outer edges of the disks 4 and 5 are sewed or otherwise suitably united.

From the foregoing description, it will be seen that each body 3 presents upper and lower circular convex surfaces, which tend by their impingement against the atmosphere, when tilted at an angle to the normal plane of travel, to counteract the tilting motion by resisting pressures of the air thereon, whereby any tendency of the machine to move out of a normal balanced condition will be resisted, irrespective of its direction of motion, so that it will be constantly maintained in a state of equilibrium. The bodies 3 while so actuated do not of course, establish any inhibitive resistance to tilting motions of the machine for vertical or lateral steering when the steering devices are positively adjusted, but set up sufficient resistance to overcome any excess air pressures upon any portion of the machine which tend to disturb its stability.

By arranging two of the auxiliary balancing and supporting surfaces at distances in front and rear of the main supporting surface 2, and the remainder of said auxiliary balancing and supporting surfaces on opposite sides of the longitudinal axis of the machine and in front and rear of the plane of the transverse axis thereof, it will be apparent that any pressure upon one surface 3 tending to lift or depress it will meet with a counteracting resistance from its companion surface, and also with a certain degree of resistance from the other surfaces 3, whereby under all conditions of flight stability may be maintained. The stabilizing action of the auxiliary balancing and supporting surfaces is amply sufficient to maintain the machine in a state of equilibrium and prevent it from turning over, even in the event that the aviator should become incapacitated, so that the machine, when the power is spent, will descend to the ground in a balanced position.

I claim:—

1. The combination with a flying machine, provided with a main supporting surface, of auxiliary balancing and supporting surfaces arranged in front, in rear and at the opposite sides of the machine beyond said main supporting surface, each of said auxiliary balancing and supporting surfaces comprising a body of circular form in plan and elliptical form in vertical section, presenting opposed upper and lower convex resisting surfaces.

2. The combination with a flying machine, provided with a main supporting surface, of auxiliary balancing and supporting surfaces arranged in front, in rear and at the sides of said machine beyond said main supporting surface, each of said auxiliary balancing and supporting surfaces comprising a staff, and a body mounted on said staff, said body being of circular form in plan and oval form in cross section and presenting opposed upper and lower convex surfaces, and frame arms carrying said auxiliary balancing and supporting surfaces and fixed to the staff.

In testimony whereof I affix my signature in presence of two witnesses.

RALPH P. FOX.

Witnesses:
G. W. HARDY,
HOWARD A. JOHNSON.